(12) United States Patent
Yen et al.

(10) Patent No.: US 8,179,441 B2
(45) Date of Patent: May 15, 2012

(54) HAND-OFF MONITORING METHOD AND HAND-OFF MONITORING SYSTEM

(75) Inventors: Chia-Shin Yen, Taipei County (TW); Pei-Lin Hou, Taipei County (TW); Chien-Ming Wu, Taipei County (TW); Kun-Cheng Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 753 days.

(21) Appl. No.: 12/336,515

(22) Filed: Dec. 16, 2008

(65) Prior Publication Data

US 2010/0134627 A1  Jun. 3, 2010

(30) Foreign Application Priority Data

Dec. 1, 2008 (TW) ................ 97146622 A (51) Int. Cl.
*H04N 7/18* (2006.01)
*G06K 9/00* (2006.01)
(52) U.S. Cl. ...................... 348/159; 382/100
(58) Field of Classification Search .......... 348/143–159
See application file for complete search history.

(56) References Cited

U.S. PATENT DOCUMENTS

| | | | |
|---|---|---|---|
| 8,009,863 B1* | 8/2011 | Sharma et al. | 382/100 |
| 2004/0113933 A1* | 6/2004 | Guler | 345/716 |
| 2006/0010028 A1* | 1/2006 | Sorensen | 705/10 |
| 2010/0002908 A1* | 1/2010 | Miyamoto et al. | 382/103 |
| 2010/0201821 A1* | 8/2010 | Niem et al. | 348/159 |

* cited by examiner

*Primary Examiner* — Wing Chan
*Assistant Examiner* — David X Yi
(74) *Attorney, Agent, or Firm* — Jianq Chyun IP Office (57) ABSTRACT

A hand-off monitoring method is provided for monitoring a space divided into several monitoring regions. Each of the monitoring regions is monitored by a surveillance camera. The hand-off monitoring method comprises receiving a warning signal from a location and identifying a first surveillance camera related to the location according to the warning signal. Then, an object triggering the warning signal is identified according to a video signal provided by the first surveillance camera. A moving path of the object is predicted according to a non-linear movement prediction model. Then, a control operation is performed, according to the moving path, to control the surveillance cameras in the monitoring regions where the moving path passes so as to hand-off monitor the object.

30 Claims, 5 Drawing Sheets

HAND-OFF MONITORING METHOD AND HAND-OFF MONITORING SYSTEM

CROSS-REFERENCE TO RELATED APPLICATION

This application claims the priority benefit of Taiwan application serial no. 97146622, filed on Dec. 1, 2008. The entirety of the above-mentioned patent application is hereby incorporated by reference herein and made a part of specification.

BACKGROUND OF THE INVENTION

1. Field of Invention

The present invention relates to monitoring method and a monitoring system. More particularly, the present invention relates to a hand-off monitoring method and a hand-off monitoring system.

2. Description of Related Art

Currently, in the security surveillance system for monitoring the moving objects in the space or tracking the moving objects, the moving direction of the next step of the object is predicted according to the relationship between the past location and the current location of the object. Most of the methods for predicting the possible direction of the next step of the object movement are based on the linear relationship between the past location and the current location of the object. That is, the vector of the object from the previous appearing location to the current appearing location is applied onto the current appearing location of the object to obtain the possible next step direction of the object and the possible next appearing location of the object.

However, when the movement of the object is not a linear movement but a non-linear movement, the linear relationship between the previous appearing location and the current appearing location of the object leads wrong prediction for predicting the possible next step direction of the object and the possible next appearing location of the object. Moreover, the linear movement prediction method only can predict the next step direction and the next appearing location of the object and cannot predict the multi-step movement of the object. Therefore, the linear movement prediction method cannot provide an accurate prediction result for monitoring and tracking the moving object.

SUMMARY OF THE INVENTION

Accordingly, the present invention is to provide a hand-off monitoring method capable of accurately predicting a non-linear movement path of an object.

The present invention also provides a hand-off monitoring system capable of predicting a multi-steps movement path of an object.

The present invention further provides a computer apparatus for performing a hand-off monitoring method so as to intellectually and automatically predict a non-linear movement path of an object.

To achieve these and other advantages and in accordance with the purpose of the invention, as embodied and broadly described herein, the invention provides a hand-off monitoring method for monitoring a space divided into several monitoring regions. Each of the monitoring regions is monitored by a surveillance camera. The hand-off monitoring method comprises receiving a warning signal and identifying a source location where the warning signal comes from and a first surveillance camera related to the source location according to the warning signal. Then, an object triggering the warning signal is identified according to a video signal provided by the first surveillance camera. A moving path of the object is predicted according to a non-linear movement prediction model. The moving path comprises the object moving from a first monitoring region monitored by the first surveillance camera to a second monitoring region monitored by a second surveillance camera and from the second monitoring region to a third monitoring region monitored by a third surveillance camera. Then, a control operation is performed, according to the moving path, to control at least the first surveillance camera, the second surveillance camera and the third surveillance camera so as to hand-off monitor the object.

According to one embodiment of the present invention, the non-linear movement prediction model comprises a plurality of moving mode matrixes.

According to one embodiment of the present invention, each of the moving mode matrixes corresponds to a single movement between different monitoring regions and each of the moving mode matrixes is defined according to a first matrix equation as following:

$$P^k = \begin{bmatrix} a_{1,1}^k & a_{1,2}^k & a_{1,3}^k & a_{1,4}^k & \cdots & \cdots & a_{1,n}^k \\ a_{2,1}^k & a_{2,2}^k & a_{2,3}^k & a_{2,4}^k & \cdots & \cdots & a_{2,n}^k \\ a_{3,1}^k & a_{3,2}^k & a_{3,3}^k & a_{3,4}^k & \cdots & \cdots & a_{3,n}^k \\ a_{4,1}^k & a_{4,2}^k & a_{4,3}^k & a_{4,4}^k & \cdots & \cdots & a_{4,n}^k \\ \vdots & \vdots & \vdots & \vdots & \vdots & \vdots & \vdots \\ \vdots & \vdots & \vdots & \vdots & \vdots & \vdots & \vdots \\ a_{n,1}^k & a_{n,2}^k & a_{n,3}^k & a_{n,4}^k & \cdots & \cdots & a_{n,n}^k \end{bmatrix},$$

wherein k is natural number, $P^k$ denotes a monitoring region movement mode of the object while the object is at k-th single monitoring region movement and $a_{i,j}^k$ denotes a movement probability of the object moving from a monitoring region j into a monitoring region i while the object is at k-th single monitoring region movement and n denotes numbers of the monitoring regions.

According to one embodiment of the present invention, when the moving path including a first-time single monitoring region movement of the object is assumed, the moving path is predicted according to a first probability equation as following:

$$P^1 \times \begin{bmatrix} 1 \\ 0 \\ 0 \\ 0 \\ \vdots \\ \vdots \\ 0 \end{bmatrix} = \begin{bmatrix} b_1 \\ b_2 \\ b_3 \\ b_4 \\ \vdots \\ \vdots \\ b_n \end{bmatrix},$$

wherein $P^1$ denotes a first-time single monitoring region movement mode and $b_n$ denotes a probability of the object appearing in n-th monitoring region after the first-time single monitoring region movement of the object.

According to one embodiment of the present invention, when the moving path including the object conducting the single monitoring region movement for w consecutive times is assumed, the moving path is predicted according to a second probability equation as following:

$$P^w \times P^{w-1} \ldots \times P^2 \times P^1 \times \begin{bmatrix} 1 \\ 0 \\ 0 \\ 0 \\ \vdots \\ \vdots \\ 0 \end{bmatrix} = \begin{bmatrix} C_1 \\ C_2 \\ C_3 \\ C_4 \\ \vdots \\ \vdots \\ C_n \end{bmatrix},$$

wherein w is natural number, $P^1$ denotes a first-time single monitoring region movement mode, $P^2$ denotes a second-time single monitoring region movement mode, $P^{w-1}$ denotes a w−1-th-time single monitoring region movement mode, $P^w$ denotes a w-time single monitoring region movement mode, and $C_n$ denotes a probability of the object appearing in n-th monitoring region after the object conducts the single region movement for w consecutive times.

According to one embodiment of the present invention, the hand-off monitoring method further comprises performing a training process for updating the non-linear movement prediction model. Furthermore, the training process comprises providing a plurality of matrixes, wherein each of the matrixes comprises a plurality of probability entries. A plurality of sample paths is provided and an updating process is performed for inputting the sample paths in sequence so as to sequentially update each of the probability entries of each of the matrixes to be the movement probabilities and the matrixes to be the moving mode matrixes respectively.

According to one embodiment of the present invention, values of the probability entries are zero.

According to one embodiment of the present invention, the updating process is performed according to a first equation as following:

$$a_{i,j}^k = \frac{\text{PS\_path}_{ij} + 1}{SN_j}$$

and a second equation as following:

$$a_{x,j}^k = \frac{\text{PS\_path}_{xj}}{SN_j}, x \neq i,$$

wherein $a_{i,j}^k$ denote a movement probability of the object moving from a monitoring region j into a monitoring region i while the object is at k-th single monitoring region movement, $a_{x,j}^k$ denotes a movement probability of the object moving from the monitoring region j into a monitoring region x while the object is at k-th single monitoring region movement, $\text{PS\_path}_{ij}$ denotes numbers of a previous sample paths from the monitoring region j into the monitoring region i, $\text{PS\_path}_{xj}$ denotes numbers of a previous sample paths from the monitoring region j into the monitoring region x and $SN_j$ denotes the number of trained sample paths starting from the monitoring region j.

According to one embodiment of the present invention, the step of inputting the sample paths comprises practically monitoring at least an actual moving path of at least a testing object in a period of time.

According to one embodiment of the present invention, the step of inputting the sample paths comprises manually inputting the sample paths.

According to one embodiment of the present invention, the control operation further comprises fine tuning each of the surveillance cameras in the monitoring regions where the moving path passes to respectively aim at an entrance of each of the monitoring regions where the object will possibly pass.

According to one embodiment of the present invention, the non-linear movement prediction model is established according to the Markov model.

The present invention also provides a hand-off monitoring system for monitoring a space divided into a plurality of monitoring regions. Each of the monitoring regions is monitored by a surveillance camera. The hand-off monitoring system comprises a signal receiving module, a signal analyzing module, an image analyzing module, a moving path predicting module and a control module. The signal receiving module is used for receiving a warning signal. The signal analyzing module is used for identifying a source location where the warning signal comes from and a first surveillance camera related to the source location according to the warning signal. The image analyzing module is used for identifying an object triggering the warning signal according to a video signal provided by the first surveillance camera. The moving path predicting module is used for predicting a moving path of the object according to a non-linear movement prediction model and the moving path comprises the object moving from a first monitoring region monitored by the first surveillance camera to a second monitoring region monitored by a second surveillance camera and from the second monitoring region to a third monitoring region monitored by a third surveillance camera. The control module is used for performing a control operation, according to the moving path, to control at least the first surveillance camera, the second surveillance camera and the third surveillance camera so as to hand-off monitor the object.

The invention further provides a computer apparatus. The computer apparatus communicates with a plurality of surveillance cameras to hand-off monitor a space. The space is divided into a plurality of monitoring regions and the monitoring regions are monitored by the surveillance cameras respectively. The computer apparatus comprises a signal transceiver and a processor. The signal transceiver is used for receiving a warning signal and a plurality of video signals provided by the surveillance cameras. The processor is used for executing a computer readable program having a plurality of procedure steps. The procedure steps comprises identifying a source location where the warning signal comes from and a first surveillance camera related to the source location according to the warning signal and identifying an object triggering the warning signal according to a first video signal provided by the first surveillance camera. The procedure steps further comprises predicting a moving path of the object according to a non-linear movement prediction model and performing a control operation, according to the moving path, to control surveillance cameras in the monitoring regions where the moving path passes.

In the present invention, the non-linear movement path of a suspected object can be accurately predicted by using the non-linear movement prediction model. Furthermore, the surveillance cameras arranged in the monitoring regions where the predicted moving path passes can be controlled in advance for the hand-off monitoring so as to improve the accuracy for the real-time monitoring.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
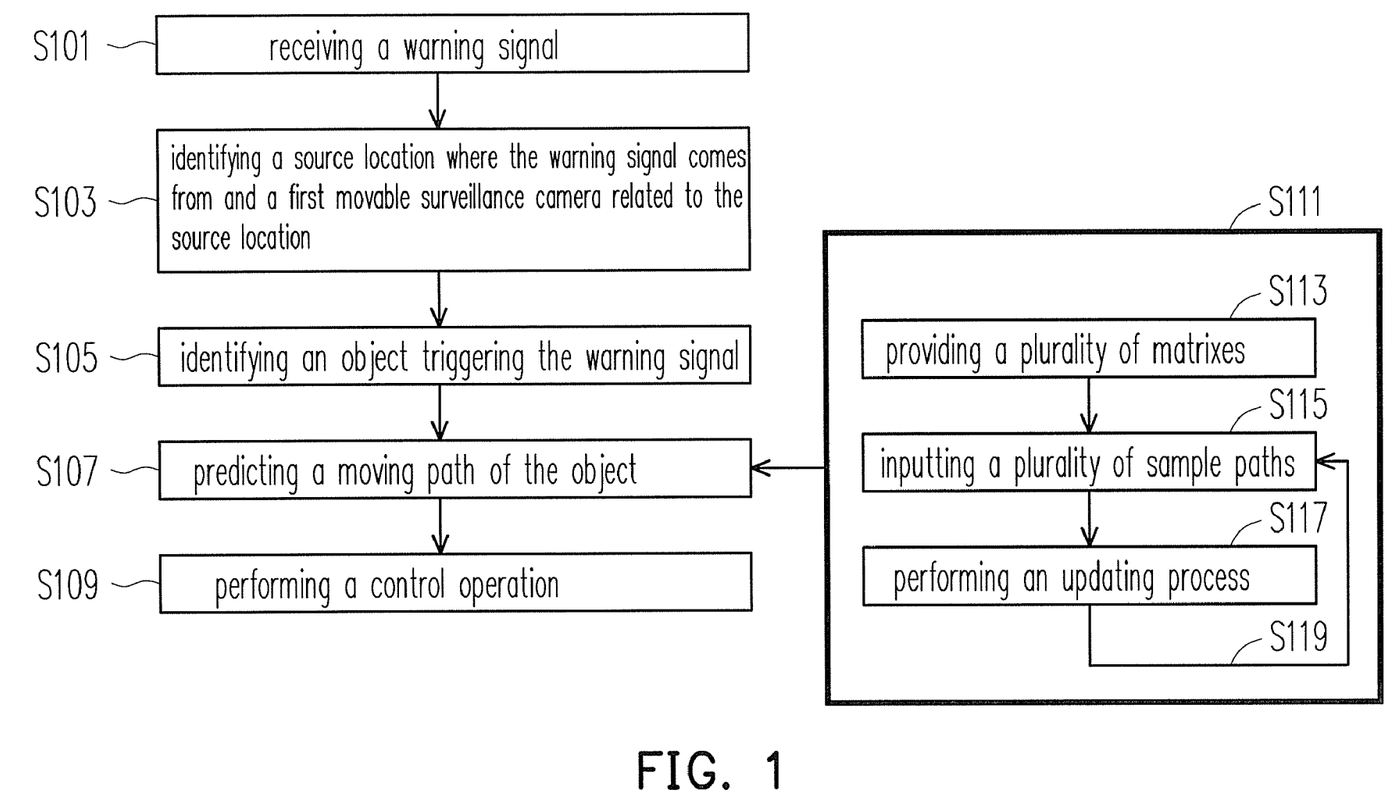
FIG. 1 is a flow chart illustrating a hand-off monitoring method according to an embodiment of the invention.

FIG. 1 is a flow chart illustrating a hand-off monitoring method according to an embodiment of the invention. The invention provides a hand-off monitoring method for monitoring a space, which is divided into several monitoring regions. Each of the monitoring regions is monitored by a surveillance camera. It should be noticed that the surveillance camera can be, for example but not limited to, a pan-tilt-zoom camera or a speed dome. As shown in FIG. 1, in the step S101, a warning signal is received. Then, in the step S103, a source location where the warning signal comes from and a first surveillance camera related to the source location according to the warning signal are identified.

Figure 1A:
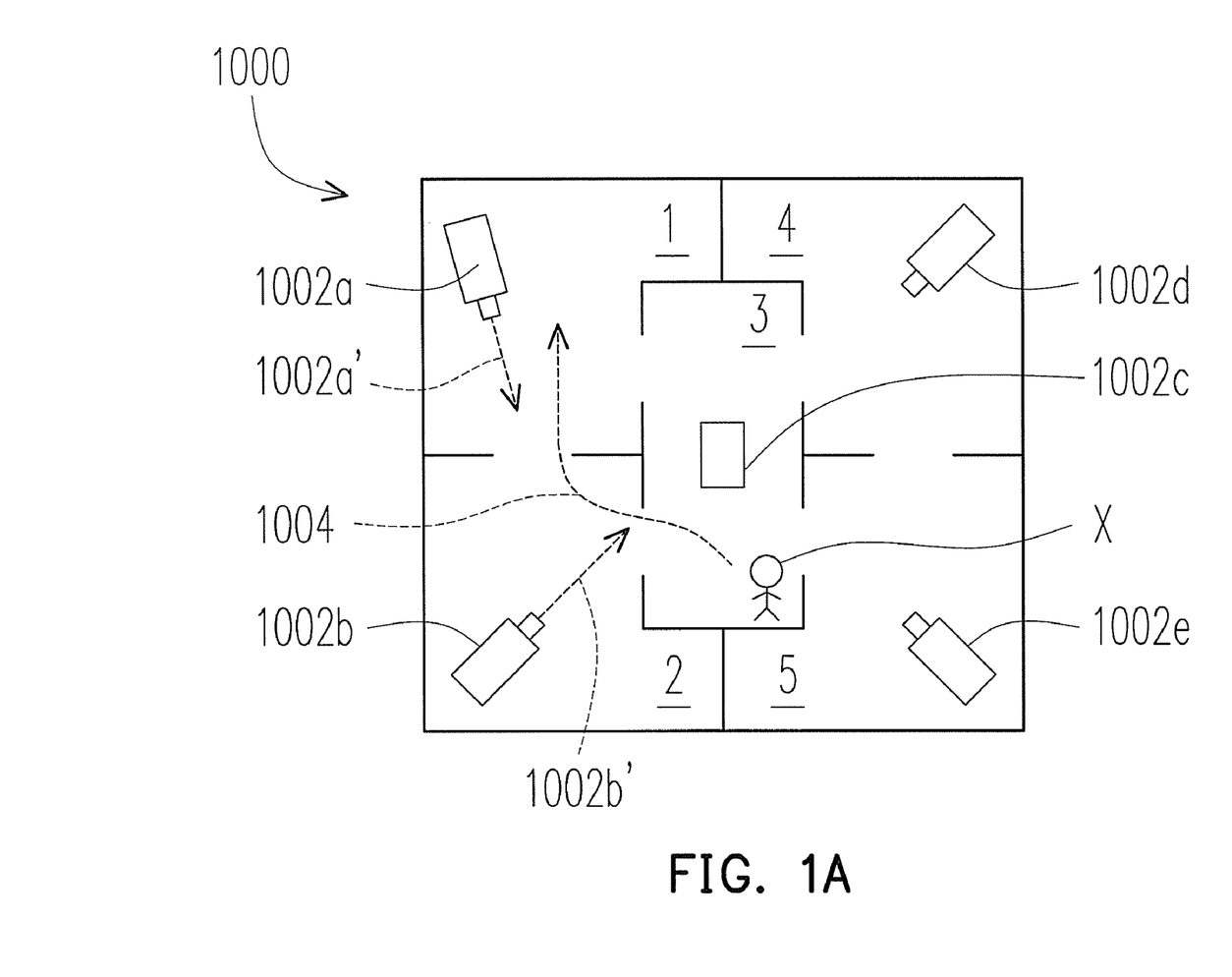
FIG. 1A is a diagram schematically showing a predicted moving path according to the hand-off monitoring method shown in FIG. 1.

Thereafter, in the step S105, according to a video signal provided by the first surveillance camera, an object triggering the warning signal is identified. This object can be a human, an event, a car or any mobile object. Then, in the step S107, a moving path of the object is predicted according to a non-linear movement prediction model. FIG. 1A is a diagram schematically showing a predicted moving path according to the hand-off monitoring method shown in FIG. 1. As shown in FIG. 1A, in the space 1000, there are five monitoring regions labeled 1, 2, 3, 4 and 5 monitored by surveillance cameras 1002a, 1002b, 1002c, 1002d and 1002e respectively. When a human X in the monitoring region 3 triggers the warning signal, a moving path 1004 (as shown by the dotted line in FIG. 1A) is predicted by using the prediction model. The moving path 1004 comprises the human X moving from the monitoring region 3 monitored by the surveillance camera 1002c to the monitoring region 2 monitored by the surveillance camera 1002b and from the monitoring region 2 to the monitoring region 1 monitored by the surveillance camera 1002a.

In one embodiment, the aforementioned non-linear movement prediction model is established according to the Markov model. Furthermore, this non-linear movement prediction model comprises several moving mode matrixes. Each of the moving model matrixes corresponds to a single monitoring region movement of the object (i.e. the object moves from one monitoring region to another monitoring region one time.). Moreover, each of the moving mode matrixes is defined according to a first matrix equation as following:

$$P^k = \begin{bmatrix} a^k_{1,1} & a^k_{1,2} & a^k_{1,3} & a^k_{1,4} & \cdots & \cdots & a^k_{1,n} \\ a^k_{2,1} & a^k_{2,2} & a^k_{2,3} & a^k_{2,4} & \cdots & \cdots & a^k_{2,n} \\ a^k_{3,1} & a^k_{3,2} & a^k_{3,3} & a^k_{3,4} & \cdots & \cdots & a^k_{3,n} \\ a^k_{4,1} & a^k_{4,2} & a^k_{4,3} & a^k_{4,4} & \cdots & \cdots & a^k_{4,n} \\ \vdots & \vdots & \vdots & \vdots & \vdots & \vdots & \vdots \\ \vdots & \vdots & \vdots & \vdots & \vdots & \vdots & \vdots \\ a^k_{n,1} & a^k_{n,2} & a^k_{n,3} & a^k_{n,4} & \cdots & \cdots & a^k_{n,n} \end{bmatrix}$$

In the first matrix equation mentioned above, k is natural number and $P^k$ denotes a monitoring region movement mode of the object while the object is at k-th single monitoring region movement. $a_{i,j}^k$ denotes a movement probability of the object moving from a monitoring region j into a monitoring region i while the object is at k-th single monitoring region movement and n denotes numbers of the monitoring regions. As shown in FIG. 1A, in this embodiment, n is equal to 5.

Further, when the moving path including a first-time single monitoring region movement of the object is assumed, the moving path is predicted according to a first probability equation as following:

$$P^1 \times \begin{bmatrix} 1 \\ 0 \\ 0 \\ 0 \\ \vdots \\ \vdots \\ 0 \end{bmatrix} = \begin{bmatrix} b_1 \\ b_2 \\ b_3 \\ b_4 \\ \vdots \\ \vdots \\ b_n \end{bmatrix}$$

In the first probability equation, $P^1$ denotes a first-time single monitoring region movement mode and $b_n$ denotes a probability of the object appearing in n-th monitoring region after the first-time single monitoring region movement of the object.

Moreover, when the moving path including the object conducting the single monitoring region movement for w consecutive times is assumed, the moving path is predicted according to a second probability equation as following:

$$P^w \times P^{w-1} \ldots \times P^2 \times P^1 \times \begin{bmatrix} 1 \\ 0 \\ 0 \\ 0 \\ \vdots \\ \vdots \\ 0 \end{bmatrix} = \begin{bmatrix} C_1 \\ C_2 \\ C_3 \\ C_4 \\ \vdots \\ \vdots \\ C_n \end{bmatrix}$$

In the second probability equation, w is natural number. Also, $P^1$ denotes a first-time single monitoring region movement mode, $P^2$ denotes a second-time single monitoring region movement mode and $P^{w-1}$ denotes a w−1-th-time single monitoring region movement mode. Further, $P^w$ denotes a w-time single monitoring region movement mode and $C_n$ denotes a probability of the object appearing in n-th monitoring region after the object conducts the single region movement for w consecutive times.

As shown in FIG. 1 and FIG. 1A, in the step S109, a control operation is performed according to the moving path 1004 to control at least the surveillance cameras 1002c, 1002b and 1002a so as to hand-off monitor the object/human X. Additionally, the aforementioned control operation further comprises fine tuning each of the surveillance cameras 1002c, 1002b and 1002a in the monitoring regions 3, 2 and 1 respectively, in which the moving path passes, to respectively aim at an entrance of each of the monitoring regions 3, 2 and 1 where the object will possibly pass (As shown in FIG. 1A, the dotted arrows 1002a' and 1002b' indicate the aim directions of the surveillance cameras 1002a and 1002b respectively.).

Figure 1B:
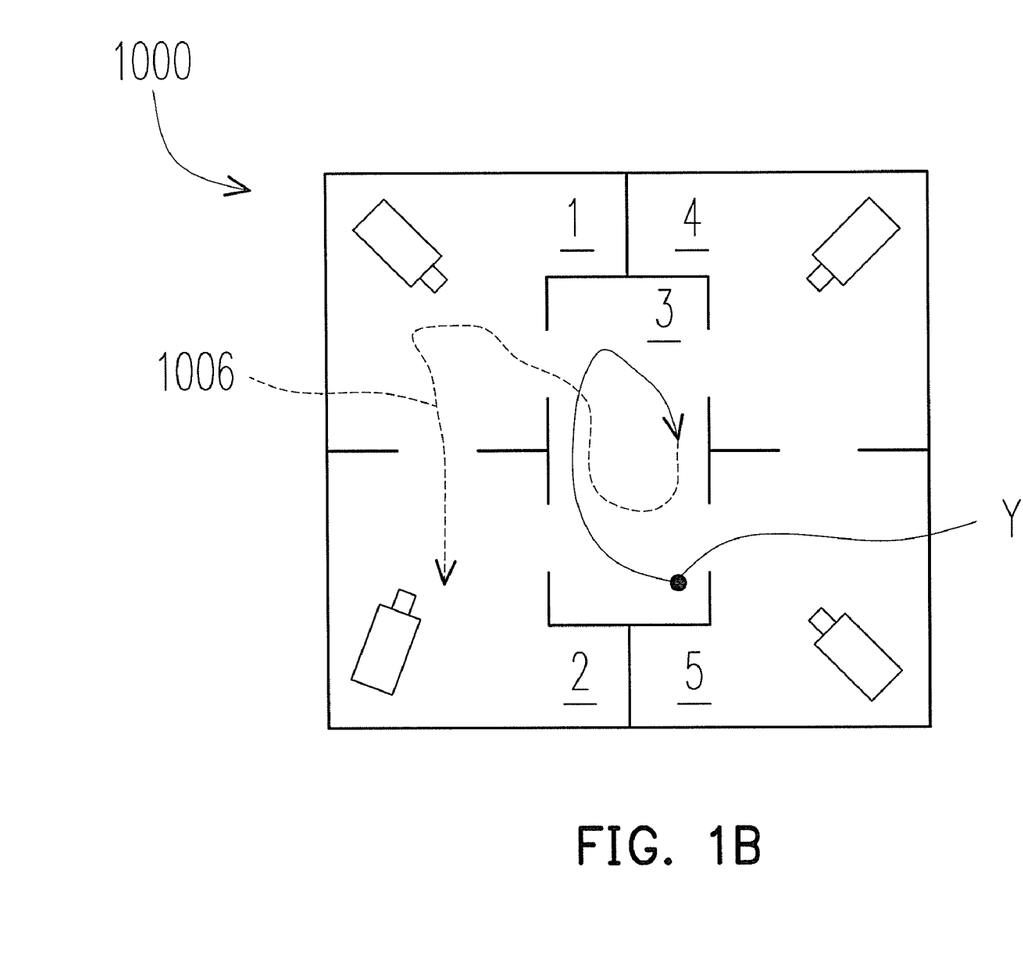
FIG. 1B is a diagram schematically showing a predicted moving path according to the hand-off monitoring method shown in FIG. 1.

FIG. 1B is a diagram schematically showing a predicted moving path according to the hand-off monitoring method shown in FIG. 1. As shown in FIG. 1B, in another embodiment, when an object Y in the monitoring region 3 triggers the warning signal, the moving path including the object conducting the single region movement once and the moving path including the object conducting the single region movement for two consecutive times are predicted by the non-linear movement prediction model and the prediction results as followings:

$$P^1 \times \begin{bmatrix} 1 \\ 0 \\ 0 \\ 0 \\ 0 \end{bmatrix} = \begin{bmatrix} 0.7 \\ 0.1 \\ 0 \\ 0.1 \\ 0.1 \end{bmatrix} \quad (a)$$

$$P^2 \times P^1 \times \begin{bmatrix} 1 \\ 0 \\ 0 \\ 0 \\ 0 \end{bmatrix} = \begin{bmatrix} 0.1 \\ 0.6 \\ 0.1 \\ 0.1 \\ 0.1 \end{bmatrix} \quad (b)$$

The equation (a) shows that the probability of the object Y appearing in the monitoring region 1 is the highest after the object conducts the single region movement once. Further, the equation (b) shows that the probability of the object Y appearing in the monitoring region 2 is the highest after the object conducts the single region movement for two consecutive times. Hence, the predicted moving path of the object Y is represented by the dotted line 1006 shown in FIG. 1B. That is, the object Y is predicted to be moving from the monitoring region 3 to the monitoring region 1 and then to the monitoring region 2 from the monitoring region 1.

As shown in FIG. 1, the aforementioned hand-off monitoring method further comprises performing a training process (step S111) for establishing or updating the non-linear movement prediction model. The training process (step S111) comprises providing several matrixes and each of the matrixes comprises several probability entries (i.e. the movement probability mentioned above) (step S113). When the training process S111 is an initialized training, the values of the probability entries (i.e. the initial movement probability) are zero.

Then, several sample paths are provided (step S115) and one sample path is inputted for the training process a time. According to the sample path for training the prediction model in every training time, an updating process is performed (step S117) so as to update each of the probability entries in each of the matrixes in every training time. Taking the initialized training as an example, after the cycle of inputting sample path and then updating the probability entries is repeated in every training time (step S119), every initial movement probability is updated to be the movement probability and the initial matrixes to be the moving mode matrixes. Alternatively, as for the established non-linear movement prediction model, the moving mode matrixes in the outdated non-linear movement prediction model can be updated by repeating the cycle of inputting the new sample path and then updating the probability entries in every training time. Since the majority path pattern of the sample paths varied with time or the habitual moving paths varied with environmental events, the non-linear movement prediction model updated at specific time or updated with the events can aid the prediction accuracy for predicting the movement of the object in different circumstances and different periods of time.

Also, the updating process mentioned above is performed according to a first equation and a second equation as followings:

$$a_{i,j}^k = \frac{PS\_path_{ij} + 1}{SN_j},$$

the first equation and $$a_{x,j}^k = \frac{PS\_path_{xj}}{SN_j},$$

the second equation.

In the first equation and the second equation, x≠i. Furthermore, $a_{i,j}^k$ denotes a movement probability of the object moving from a monitoring region j into a monitoring region i while the object is at k-th single monitoring region movement. $a_{x,j}^k$ denotes a movement probability of the object moving from the monitoring region j into a monitoring region x while the object is at k-th single monitoring region movement. Moreover, $PS\_path_{ij}$ denotes numbers of a previous sample paths from the monitoring region j into the monitoring region i and $PS\_path_{xj}$ denotes numbers of a previous sample paths from the monitoring region j into the monitoring region x. $SN_j$ denotes numbers of trained sample paths starting from the monitoring region j.

Additionally, the aforementioned step of inputting sample paths can be, for example, practically monitoring at least an actual moving path of at least a testing object in a period of time. Alternatively, the step of inputting the sample paths can be, for example, manually inputting the sample paths.

Figure 2:
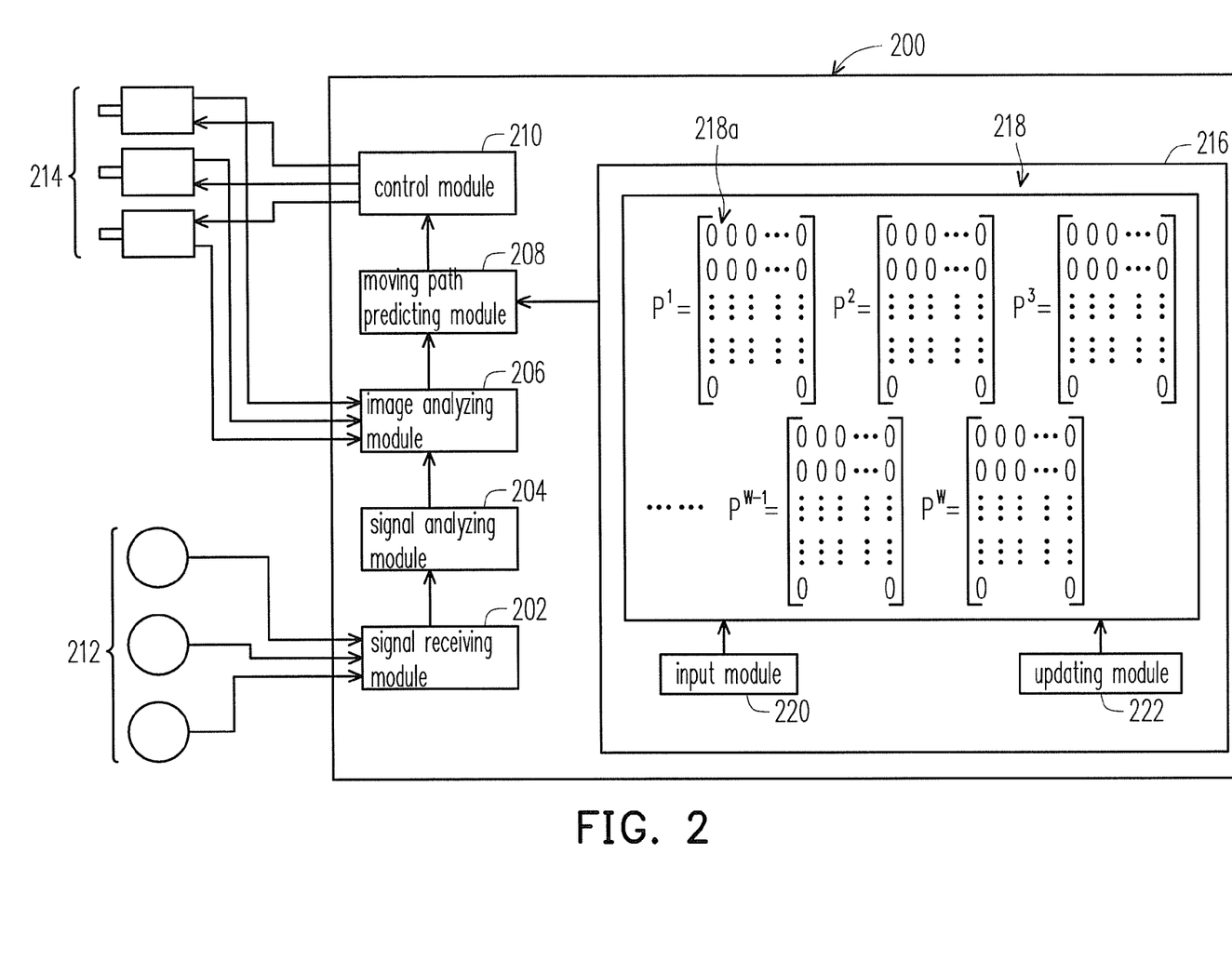
FIG. 2 is a block diagram showing a hand-off monitoring system according to another embodiment of the present invention.

FIG. 2 is a block diagram showing a hand-off monitoring system according to another embodiment of the present invention. As shown in FIG. 2, the hand-off monitoring system 200 is used for monitoring a space which is divided into several monitoring regions and each of the monitoring regions is monitored by a surveillance camera. This hand-off monitoring system 200 comprises a signal receiving module 202, a signal analyzing module 204, an image analyzing module 206, a moving path predicting module 208 and a control module 210.

The signal receiving module 202 is used for receiving a warning signal. This warning signal can be, for example, electronic signal produced by one of the sensors 212 arranged in the monitoring regions. The sensor 212 can be, for example, infrared sensor, sound wave sensor or electric wave sensor. The signal analyzing module 204 identifies a source location where the warning signal comes from and a first surveillance camera 214 related to the source location according to the warning signal. The image analyzing module 206 identifies an object triggering the warning signal according to a video signal provided by the first surveillance camera 214.

The moving path predicting module 208 predicts a moving path of the object according to a non-linear movement prediction model. The moving mode matrixes of the non-linear movement prediction model and the matrix operations for predicting the moving path of the object are detail described in the previous embodiment and are not described herein. The control module 210 is used for performing a control operation, according to the moving path, to control at least the surveillance cameras in the monitoring regions at the moving path so as to hand-off monitor the object.

The hand-off monitoring system further comprises a training module 216 for performing a training process to update or establish the non-linear movement prediction model. The training module 216 comprises several matrixes 218 and each of the matrixes 218 comprises several probability entries 218a. In the present embodiment, a way to establish a non-linear movement prediction model is used as an example to describe the present invention. Hence, each probability entry of each matrix is the initial movement probability and is zero. The training module 216 also comprises an input module 220 and an updating module 222. The input module 220 inputs the sample paths one by one into the training module 216. Every time a sample path is inputted, the updating module 222 updates each probability entry once. The aforementioned steps for inputting the sample paths and updating the probability entries and the matrix operation for updating the entries of the matrixes are described in the previous embodiments and are not described herein.

Figure 3:
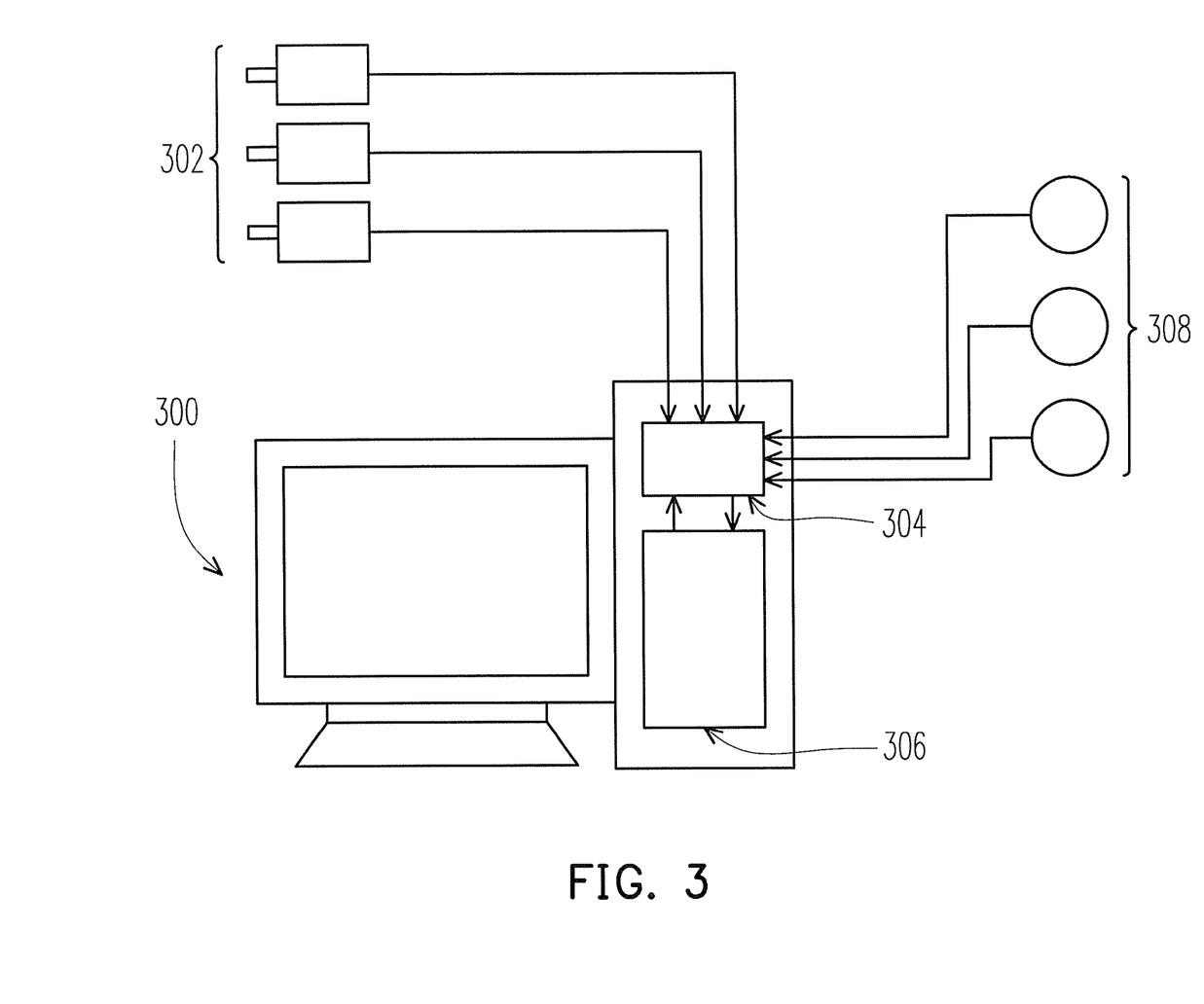
FIG. 3 is a computer apparatus according to the other embodiment of the present invention.

FIG. 3 is a computer apparatus according to the other embodiment of the present invention. As shown in FIG. 3, a computer apparatus 300 is communicated with several surveillance cameras 302 to hand-off monitor a space. The space is divided into several monitoring regions and each of the monitoring regions is monitored by a surveillance camera. The computer apparatus 300 comprises a signal transceiver 304 and a processor 306. The signal transceiver 304 is used for receiving a warning signal and a plurality of video signals provided by the surveillance cameras 302. Moreover, the warning signal can be, for example, electronic signal produced by one of the sensors 308 arranged in the monitoring regions. The sensor 308 can be, for example, infrared sensor, sound wave sensor or electric wave sensor.

The processor 306 is used for executing a computer readable program having several procedure steps including the steps S101 through S109 and the training process S111 (including steps S113 through S119). Since the aforementioned procedure steps are detail described in the hand-off monitoring method related to FIG. 1, the procedure steps of the computer readable program are not described herein.

In the present invention, the prediction accuracy of the non-linear movement path of the object can be improved by using the non-linear movement prediction model. Further, the surveillance cameras arranged in the monitoring regions, in which the predicted moving path passes, can be controlled to performing the hand-off monitor method. Therefore, the surveillance accuracy for monitoring an object is improved. Also, by performing the training process with manually inputting sample path or practically monitoring the moving path of at least one sample object as the sample path, and updating non-linear movement prediction model according to different periods of time and events, the updated non-linear movement prediction model can provides more accurate prediction result. Therefore, suspected object can be continuously monitored in an intellectual way.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A hand-off monitoring method for monitoring a space divided into several monitoring regions, wherein each of the monitoring regions is equipped with a sensor and is monitored by a surveillance camera, comprising:
   one of the sensor producing a warning signal;
   a computer apparatus receiving the warning signal;
   according to the warning signal, the computer apparatus identifying a source location where the sensor producing the warning signal is located and a first surveillance camera related to the source location;
   according to a video signal provided by the first surveillance camera, the computer apparatus identifying an object triggering the sensor to produce the warning signal;
   the computer apparatus predicting a moving path of the object according to a non-linear movement prediction model, wherein the moving path comprises the object moving from a first monitoring region monitored by the first surveillance camera to a second monitoring region monitored by a second surveillance camera and from the second monitoring region to a third monitoring region monitored by a third surveillance camera;
   wherein the non-linear movement prediction model comprises a plurality of moving mode matrixes;
   wherein each of the moving mode matrixes corresponds to a single monitoring region movement and each of the moving mode matrixes is defined according to a first matrix equation as following:

$$P^k = \begin{bmatrix} a^k_{1,1} & a^k_{1,2} & a^k_{1,3} & a^k_{1,4} & \cdots & \cdots & a^k_{1,n} \\ a^k_{2,1} & a^k_{2,2} & a^k_{2,3} & a^k_{2,4} & \cdots & \cdots & a^k_{2,n} \\ a^k_{3,1} & a^k_{3,2} & a^k_{3,3} & a^k_{3,4} & \cdots & \cdots & a^k_{3,n} \\ a^k_{4,1} & a^k_{4,2} & a^k_{4,3} & a^k_{4,4} & \cdots & \cdots & a^k_{4,n} \\ \vdots & \vdots & \vdots & \vdots & \vdots & \vdots & \vdots \\ \vdots & \vdots & \vdots & \vdots & \vdots & \vdots & \vdots \\ a^k_{n,1} & a^k_{n,2} & a^k_{n,3} & a^k_{n,4} & \cdots & \cdots & a^k_{n,n} \end{bmatrix},$$

wherein k is natural number, $P^k$ denotes a monitoring region movement mode of the object while the object is at k-th single monitoring region movement and $a_{i,j}^k$ denotes a movement probability of the object moving from a monitoring region j into a monitoring region i while the object is at k-th single monitoring region movement and n denotes numbers of the monitoring regions; and
   according to the moving path, the computer apparatus performing a control operation, according to the moving path, to control at least the first surveillance camera, the second surveillance camera and the third surveillance camera so as to hand-off monitor the object.

2. The hand-off monitoring method of claim 1, wherein when the moving path including a first-time single monitoring region movement of the object is assumed, the moving path is predicted according to a first probability equation as following:

$$P^1 \times \begin{bmatrix} 1 \\ 0 \\ 0 \\ 0 \\ \vdots \\ \vdots \\ 0 \end{bmatrix} = \begin{bmatrix} b_1 \\ b_2 \\ b_3 \\ b_4 \\ \vdots \\ \vdots \\ b_n \end{bmatrix},$$

wherein $P^1$ denotes a first-time single monitoring region movement mode and $b_n$ denotes a probability of the object appearing in n-th monitoring region after the first-time single monitoring region movement of the object.

3. The hand-off monitoring method of claim 1, wherein when the moving path including the object conducting the single monitoring region movement for w consecutive times is assumed, the moving path is predicted according to a second probability equation as following:

$$P^w \times P^{w-1} \ldots \times P^2 \times P^1 \times \begin{bmatrix} 1 \\ 0 \\ 0 \\ 0 \\ \vdots \\ \vdots \\ 0 \end{bmatrix} = \begin{bmatrix} C_1 \\ C_2 \\ C_3 \\ C_4 \\ \vdots \\ \vdots \\ C_n \end{bmatrix},$$

wherein w is natural number, $P^1$ denotes a first-time single monitoring region movement mode, $P^2$ denotes a second-time single monitoring region movement mode, $P^{w-1}$ denotes a w–1-th-time single monitoring region movement mode, $P^w$ denotes a w-time single monitoring region movement mode, and $C_n$ denotes a probability of the object appearing in n-th monitoring region after the object conducts the single region movement for w consecutive times.

4. The hand-off monitoring method of claim 1 further comprising the computer apparatus performing a training process for updating the non-linear movement prediction model, wherein the training process comprises:
the computer apparatus receiving a plurality of matrixes, wherein each of the matrixes comprises a plurality of probability entries;
the computer apparatus receiving a plurality of sample paths; and
the computer apparatus performing an updating process for inputting the sample paths in sequence so as to sequentially update each of the probability entries of each of the matrixes to be the movement probabilities and the matrixes to be the moving mode matrixes respectively.

5. The hand-off monitoring method of claim 4, wherein values of the probability entries are zero.

6. The hand-off monitoring method of claim 4, wherein the updating process is performed according to a first equation as following:

$$a_{i,j}^k = \frac{PS\_path_{ij} + 1}{SN_j}$$

and a second equation as following:

$$a_{x,j}^k = \frac{PS\_path_{xj}}{SN_j}, x \neq i,$$

wherein $a_{i,j}^k$ denote a movement probability of the object moving from a monitoring region j into a monitoring region i while the object is at k-th single monitoring region movement, $a_{x,j}^k$ denotes a movement probability of the object moving from the monitoring region j into a monitoring region x while the object is at k-th single monitoring region movement, $PS\_path_{ij}$ denotes numbers of a previous sample paths from the monitoring region j into the monitoring region i, $PS\_Path_{xj}$ denotes numbers of a previous sample paths from the monitoring region j into the monitoring region x and $SN_j$ denotes numbers of trained sample paths starting from the monitoring region j.

7. The hand-off monitoring method of claim 4, wherein the step of the computer apparatus receiving the sample paths comprises the surveillance camera practically monitoring at least an actual moving path of at least a testing object in a period of time.

8. The hand-off monitoring method of claim 4, wherein the received sample paths is inputted by a user.

9. The hand-off monitoring method of claim 1, wherein the computer apparatus performing the control operation further to fine tune each of the surveillance cameras in the monitoring regions where the moving path passes to respectively aim at an entrance of each of the monitoring regions where the object will possibly pass.

10. The hand-off monitoring method of claim 1, wherein the non-linear movement prediction model is established according to the Markov model.

11. A hand-off monitoring system for monitoring a space divided into a plurality of monitoring regions, wherein each of the monitoring regions is equipped with a sensor and is monitored by a surveillance camera, comprising:
a signal receiving module for receiving a warning signal produced by one of the sensors;
according to the warning signal, means for identifying a source location where the sensor producing the warning signal is located and a first surveillance camera related to the source location;
according to a video signal provided by the first surveillance camera, means for identifying an object triggering the sensor to produce the warning signal;
means for predicting a moving path of the object according to a non-linear movement prediction model, wherein the moving path comprises the object moving from a first monitoring region monitored by the first surveillance camera to a second monitoring region monitored by a second surveillance camera and from the second monitoring region to a third monitoring region monitored by a third surveillance camera;
wherein the non-linear movement prediction model comprises a plurality of moving mode matrixes;
wherein each of the moving mode matrixes corresponds to a single monitoring region movement and each of the moving mode matrixes is defined according to a first matrix equation as following:

$$P^k = \begin{bmatrix} a^k_{1,1} & a^k_{1,2} & a^k_{1,3} & a^k_{1,4} & \cdots & \cdots & a^k_{1,n} \\ a^k_{2,1} & a^k_{2,2} & a^k_{2,3} & a^k_{2,4} & \cdots & \cdots & a^k_{2,n} \\ a^k_{3,1} & a^k_{3,2} & a^k_{3,3} & a^k_{3,4} & \cdots & \cdots & a^k_{3,n} \\ a^k_{4,1} & a^k_{4,2} & a^k_{4,3} & a^k_{4,4} & \cdots & \cdots & a^k_{4,n} \\ \vdots & \vdots & \vdots & \vdots & \vdots & \vdots & \vdots \\ \vdots & \vdots & \vdots & \vdots & \vdots & \vdots & \vdots \\ a^k_{n,1} & a^k_{n,2} & a^k_{n,3} & a^k_{n,4} & \cdots & \cdots & a^k_{n,n} \end{bmatrix},$$

wherein k is natural number, $P^k$ denotes a monitoring region movement mode of the object while the object is at k-th single monitoring region movement and $a_{i,j}^k$ denotes a movement probability of the object moving from a monitoring region j into a monitoring region i while the object is at k-th single monitoring region movement and n denotes numbers of the monitoring regions; and according to the moving path, means for performing a control operation, according to the moving path, to control at least the first surveillance camera, the second surveillance camera and the third surveillance camera so as to hand-off monitor the object.

12. The hand-off monitoring system of claim 11, wherein when the moving path including a first-time single monitoring region movement of the object is assumed, the moving path is predicted according to a first probability equation as following:

$$P^1 \times \begin{bmatrix} 1 \\ 0 \\ 0 \\ 0 \\ \vdots \\ \vdots \\ 0 \end{bmatrix} = \begin{bmatrix} b_1 \\ b_2 \\ b_3 \\ b_4 \\ \vdots \\ \vdots \\ b_n \end{bmatrix},$$

wherein $P^1$ denotes a first-time single monitoring region movement mode and $b_n$ denotes a probability of the object appearing in n-th monitoring region after the first-time single monitoring region movement of the object.

13. The hand-off monitoring system of claim 11, wherein when the moving path including the object conducting the single monitoring region movement for w consecutive times is assumed, the moving path is predicted according to a second probability equation as following:

$$P^w \times P^{w-1} \ldots \times P^2 \times P^1 \times \begin{bmatrix} 1 \\ 0 \\ 0 \\ 0 \\ \vdots \\ \vdots \\ 0 \end{bmatrix} = \begin{bmatrix} C_1 \\ C_2 \\ C_3 \\ C_4 \\ \vdots \\ \vdots \\ C_n \end{bmatrix},$$

wherein w is natural number, $P^1$ denotes a first-time single monitoring region movement mode, $P^2$ denotes a second-time single monitoring region movement mode, $P^{w-1}$ denotes a w-1-th-time single monitoring region movement mode, $P^w$ denotes a w-time single monitoring region movement mode, and $C_n$ denotes a probability of the object appearing in n-th monitoring region after the object conducts the single region movement for w consecutive times.

14. The hand-off monitoring system of claim 11 further comprising means for performing a training process for updating the non-linear movement prediction model, wherein means for performing the training process for updating the non-linear movement prediction model comprises:

a plurality of matrixes, wherein each of the matrixes comprises a plurality of probability entries;

means for receiving a plurality of sample paths; and means for updating each of the probability entries of each of the matrixes every time one of the sample paths is input so as to update the probability entries of each of the matrixes to be the movement probabilities and the matrixes to be the moving mode matrixes respectively.

15. The hand-off monitoring system of claim 14, wherein the values of the probability entries are zero.

16. The hand-off monitoring system of claim 14, wherein the updating process is performed according to a first equation as following:

$$a_{i,j}^k = \frac{\text{PS\_path}_{ij} + 1}{SN_j}$$

and a second equation as following:

$$a_{x,j}^k = \frac{\text{PS\_path}_{xj}}{SN_j}, x \ne i,$$

wherein $a_{i,j}^k$ denote a movement probability of the object moving from a monitoring region j into a monitoring region i while the object is at k-th single monitoring region movement, $a_{x,j}^k$ denotes a movement probability of the object moving from the monitoring region j into a monitoring region x while the object is at k-th single monitoring region movement, $\text{PS\_path}_{ij}$ denotes numbers of a previous sample paths from the monitoring region j into the monitoring region i, $\text{PS\_path}_{xj}$ denotes numbers of a previous sample paths from the monitoring region j into the monitoring region x and $SN_j$ denotes numbers of trained sample paths starting from the monitoring region j.

17. The hand-off monitoring system of claim 14, wherein means for receiving the sample paths comprises means for practically monitoring at least an actual moving path of at least a testing object in a period of time.

18. The hand-off monitoring system of claim 14, wherein the received sample paths is manually inputted by a user.

19. The hand-off monitoring system of claim 11, wherein means for performing the control operation to further fine tune each of the surveillance cameras in the monitoring regions where the moving path passes to respectively aim at an entrance of each of the monitoring regions where the object will possibly pass.

20. The hand-off monitoring system of claim 11, wherein the non-linear movement prediction model is established according to the Markov model.

21. A computer apparatus for communicating with a plurality of surveillance cameras to hand-off monitor a space, wherein the space is divided into a plurality of monitoring regions and the monitoring regions are equipped with sensors respectively and are monitored by the surveillance cameras respectively, comprising:

a signal transceiver for receiving a warning signal produced by one of the sensors and a plurality of video signals provided by the surveillance cameras;

and a processor for executing a computer readable program having a plurality of procedure steps comprising:

according to the warning signal, identifying a source location where the sensor producing the warning signal is located and a first surveillance camera related to the source location;

according to a first video provided by the first surveillance camera, identifying an object triggering the sensor to produce the warning signal;

predicting a moving path of the object according to a non-linear movement prediction model, wherein the moving path comprises the object moving from a first monitoring region monitored by the first surveillance camera to a second monitoring region monitored by a second surveillance camera and from the second monitoring region to a third monitoring region monitored by a third surveillance camera;

wherein the non-linear movement prediction model comprises a plurality of moving mode matrixes;

wherein each of the moving mode matrixes corresponds to a single monitoring region movement and each of the moving mode matrixes is defined according to a first matrix equation as following:

$$P^k = \begin{bmatrix} a^k_{1,1} & a^k_{1,2} & a^k_{1,3} & a^k_{1,4} & \cdots & \cdots & a^k_{1,n} \\ a^k_{2,1} & a^k_{2,2} & a^k_{2,3} & a^k_{2,4} & \cdots & \cdots & a^k_{2,n} \\ a^k_{3,1} & a^k_{3,2} & a^k_{3,3} & a^k_{3,4} & \cdots & \cdots & a^k_{3,n} \\ a^k_{4,1} & a^k_{4,2} & a^k_{4,3} & a^k_{4,4} & \cdots & \cdots & a^k_{4,n} \\ \vdots & \vdots & \vdots & \vdots & \vdots & \vdots & \vdots \\ \vdots & \vdots & \vdots & \vdots & \vdots & \vdots & \vdots \\ a^k_{n,1} & a^k_{n,2} & a^k_{n,3} & a^k_{n,4} & \cdots & \cdots & a^k_{n,n} \end{bmatrix}$$

wherein k is natural number, $P^k$ denotes a monitoring region movement mode of the object while the object is at k-th single monitoring region movement and $a^k_{i,j}$ denotes a movement probability of the object moving from a monitoring region j into a monitoring region i while the object is at k-th single monitoring region movement and n denotes numbers of the monitoring regions; and according to the moving path, performing a control operation, to control at least the first surveillance camera, the second surveillance camera and the third surveillance camera so as to hand-off monitor the object.

22. The computer apparatus of claim 21, wherein when the moving path including a first-time single monitoring region movement of the object is assumed, the moving path is predicted according to a first probability equation as following:

$$P^1 \times \begin{bmatrix} 1 \\ 0 \\ 0 \\ 0 \\ \vdots \\ \vdots \\ 0 \end{bmatrix} = \begin{bmatrix} b_1 \\ b_2 \\ b_3 \\ b_4 \\ \vdots \\ \vdots \\ b_n \end{bmatrix},$$

wherein $P^1$ denotes a first-time single monitoring region movement mode and $b_n$ denotes a probability of the object appearing in n-th monitoring region after the first-time single monitoring region movement of the object.

23. The computer apparatus of claim 21, wherein when the moving path including the object conducting the single monitoring region movement for w consecutive times is assumed, the moving path is predicted according to a second probability equation as following:

$$P^w \times P^{w-1} \ldots \times P^2 \times P^1 \times \begin{bmatrix} 1 \\ 0 \\ 0 \\ 0 \\ \vdots \\ \vdots \\ 0 \end{bmatrix} = \begin{bmatrix} C_1 \\ C_2 \\ C_3 \\ C_4 \\ \vdots \\ \vdots \\ C_n \end{bmatrix},$$

wherein w is natural number, $P^1$ denotes a first-time single monitoring region movement mode, $P^2$ denotes a second-time single monitoring region movement mode, $P^{w-1}$ denotes a w−1-th-time single monitoring region movement mode, $P^w$ denotes a w-time single monitoring region movement mode, and $C_n$ denotes a probability of the object appearing in n-th monitoring region after the object conducts the single region movement for w consecutive times.

24. The computer apparatus of claim 21 wherein the procedure steps further comprises performing a training process for updating the non-linear movement prediction model, wherein the training process comprises:

providing a plurality of matrixes, wherein each of the matrixes comprises a plurality of probability entries;

providing a plurality of sample paths; and performing an updating process for inputting the sample paths in sequence so as to sequentially update each of the probability entries of each of the matrixes to be the movement probabilities and the matrixes to be the moving mode matrixes respectively.

25. The computer apparatus of claim 24, wherein values of the probability entries are zero.

26. The computer apparatus of claim 24, wherein the updating process is performed according to a first equation as following:

$$a^k_{i,j} = \frac{\text{PS\_path}_{ij} + 1}{SN_j}$$

and a second equation as following:

$$a_{x,j}^k = \frac{PS\_path_{xj}}{SN_j}, x \neq i,$$

wherein $a_{i,j}^k$ denote a movement probability of the object moving from a monitoring region j into a monitoring region i while the object is at k-th single monitoring region movement, $a_{x,j}^k$ denotes a movement probability of the object moving from the monitoring region j into a monitoring region x while the object is at k-th single monitoring region movement, $PS\_path_{ij}$ denotes numbers of a previous sample paths from the monitoring region j into the monitoring region i, $PS\_path_{xj}$ denotes numbers of a previous sample paths from the monitoring region j into the monitoring region x and $SN_j$ denotes numbers of trained sample paths starting from the monitoring region j.

27. The computer apparatus of claim 24, wherein the step of providing the sample paths comprises practically monitoring at least an actual moving path of at least a testing object in a period of time.

28. The computer apparatus of claim 24, wherein the step of providing the sample paths comprises manually inputting the sample paths.

29. The computer apparatus of claim 21, wherein the procedure step of performing the control operation further to fine tune each of the surveillance cameras in the monitoring regions where the moving path passes to respectively aim at an entrance of each of the monitoring regions where the object will possibly pass.

30. The computer apparatus of claim 21, wherein the non-linear movement prediction model is established according to the Markov model.

* * * * *